(12) United States Patent
Schulz et al.

(10) Patent No.: US 7,652,443 B2
(45) Date of Patent: Jan. 26, 2010

(54) METHOD AND SYSTEM FOR CONTROLLING A POWER INVERTER IN ELECTRIC DRIVES

(75) Inventors: Steven E. Schulz, Torrance, CA (US); Stephen T. West, New Palestine, IN (US); Brian A. Welchko, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 306 days.

(21) Appl. No.: 11/923,270

(22) Filed: Oct. 24, 2007

(65) Prior Publication Data

US 2009/0108780 A1   Apr. 30, 2009

(51) Int. Cl.
*H02P 7/00* (2006.01)
(52) U.S. Cl. ........................... 318/432; 318/434
(58) Field of Classification Search .............. 318/432, 318/434, 800, 801, 798
See application file for complete search history.

(56) References Cited

U.S. PATENT DOCUMENTS 5,886,491 A * 3/1999 Yoshida et al. ............... 318/592
6,254,353 B1 * 7/2001 Polo et al. ................. 417/44.11
6,469,469 B1 * 10/2002 Chambers et al. ........... 318/801

* cited by examiner

*Primary Examiner*—Rina I Duda
(74) *Attorney, Agent, or Firm*—Ingrassia Fisher & Lorenz, P.C.

(57) ABSTRACT

Methods and systems for controlling a power inverter in an electric drive system of an automobile are provided. The various embodiments control the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor.

17 Claims, 3 Drawing Sheets

METHOD AND SYSTEM FOR CONTROLLING A POWER INVERTER IN ELECTRIC DRIVES

TECHNICAL FIELD

The present invention generally relates to power inverters, and more particularly relates to methods and systems for controlling power inverters in electric drive systems.

BACKGROUND OF THE INVENTION

In recent years, advances in technology, as well as ever evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use an electric motor, perhaps in combination with another actuator, to drive the wheels.

These types of vehicles can offer significant improvements in efficiency. There remains, however, an ever present need to improve the efficiency of electric motor drives to reduce power losses, improve battery life, and increase range. Additionally, it is generally desirable to reduce the noise generated from the automobile. Unfortunately, some techniques for reducing power losses in the electric motor system can increase acoustic noise emissions beyond acceptable levels.

Accordingly, it is desirable to provide a control method that reduces power losses and increases the efficiency of electric motors in automobiles, without excessively increasing the acoustic noise generated by the electrical motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for controlling a power inverter in an electric drive system of an automobile is provided. In general, the method controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor. This reduces power loss and thus improves the efficiency of the system.

In a further embodiment, an automotive electric drive system is provided. The automotive electric drive system includes an electric motor, a power inverter coupled to the motor, and at least one processor coupled to the electric motor and the inverter. The at least one processor is configured to, responsive to a commanded torque of the electric motor being below a first torque level, provide a signal controlling the power inverter to set a switching frequency of the power inverter at a first set frequency; and, responsive to the commanded torque of the electric motor being between the first torque level and a second torque level, provide a signal controlling the power inverter to determine the switching frequency of the power inverter as a function of the commanded torque of the electric motor while maintaining the switching frequency above a dynamic frequency limit. The system reduces switching frequencies in the inverter at high commanded torques, while maintaining the switching frequencies above dynamic frequency limit that provides effective control over the motor. This reduces power loss and thus improves the efficiency of the system.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that the figures are merely illustrative and may not be drawn to scale.

The figures illustrate a method and a system for controlling a power inverter in an electric drive system of an automobile. In general, the system and method controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor. This reduces power loss and thus improves the efficiency of the system.

Figure 1:
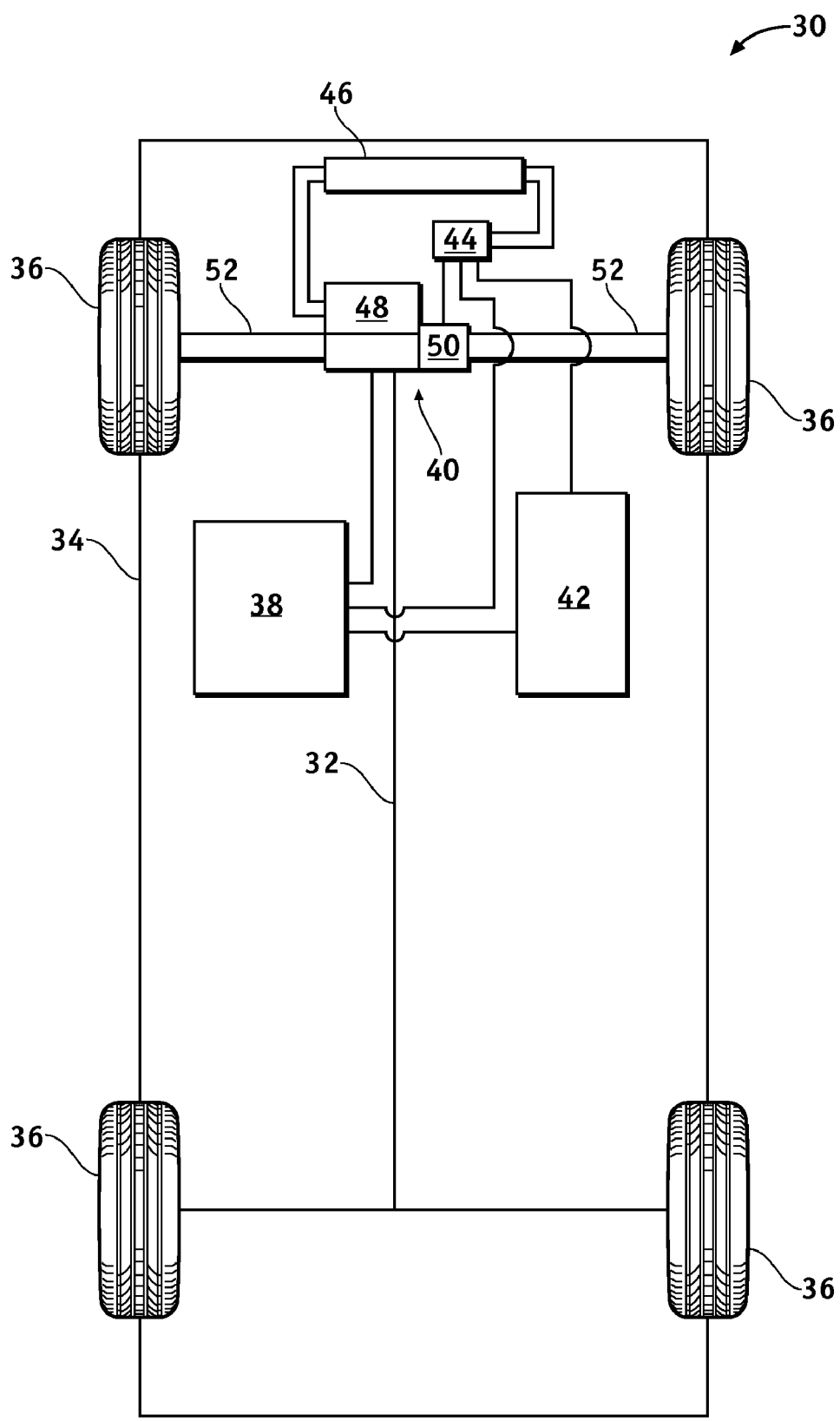
FIG. 1 is a schematic view of an exemplary automobile according to one embodiment of the present invention.

FIG. 1 illustrates a vehicle 30, or "automobile," according to one embodiment of the present invention. The automobile 30 includes a chassis 32, a body 34, four wheels 36, and an electronic control system 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine or fuel cell energy source, a combustion/electric motor hybrid engine, and an electric motor.

In the exemplary embodiment illustrated in FIG. 1, the automobile 30 is a hybrid vehicle, and further includes an actuator assembly 40, a battery (or other electrical energy storage) 42, a power inverter (or inverter) 44, and a radiator 46. The actuator assembly 40 includes a combustion engine 48 and an electric motor/generator (or motor) 50. The electric motor 50 is, in one embodiment, a sinusoidally-wound alternating current (AC) motor (e.g., permanent magnet or induction) such as commonly used in automotive vehicles (e.g., traction drive control systems, and the like). As will be appreciated by one skilled in the art, the electric motor 50 may include a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 50 may include multiple (e.g., twelve) electromagnetic poles, as is commonly understood.

Still referring to FIG. 1, in one embodiment, the combustion engine 48 and the electric motor 50 are integrated such that both are mechanically coupled to at least some of the wheels 36 through one or more drive shafts 52. The radiator 46 is connected to the frame at an outer portion thereof and although not illustrated in detail, includes multiple cooling channels therethrough that contain a cooling fluid (i.e., coolant) such as water and/or ethylene glycol (i.e., "antifreeze") and is coupled to the engine 48 and the inverter 44. Referring again to FIG. 1, in the depicted embodiment, the inverter 44 receives and shares coolant with the electric motor 50. The radiator 46 may be similarly connected to the inverter 44 and/or the electric motor 50.

The electronic control system 38 is in operable communication with the actuator assembly 40, the battery 42, and the inverter 44. Although not shown in detail, the electronic control system 38 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
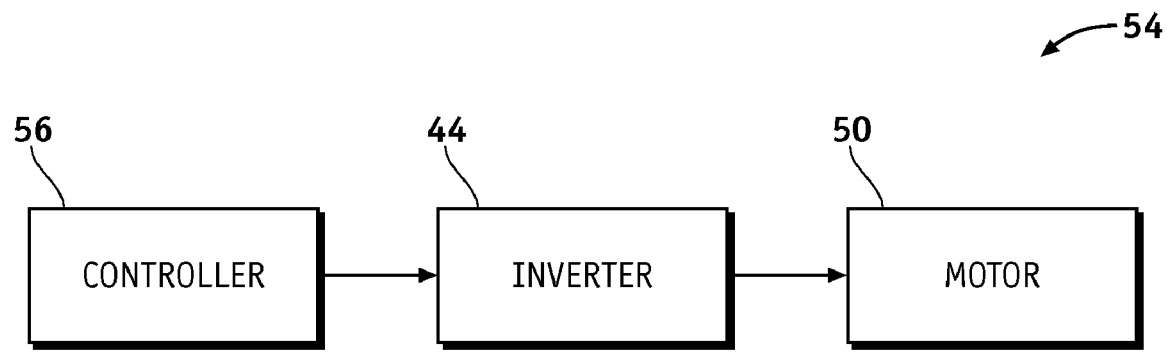
FIG. 2 is a block diagram of a voltage source inverter system within the automobile of FIG. 1.

Referring to FIG. 2, a voltage source inverter system (or electric drive system) 54 is shown in accordance with an exemplary embodiment of the present invention. The voltage source inverter system 54 includes a controller 56, the inverter 44 coupled to an output of the controller 56, and the motor 50 coupled to a first output of the inverter 44. The controller 56 and may be integral with the electronic control system 38 shown in FIG. 1.

Figure 3:
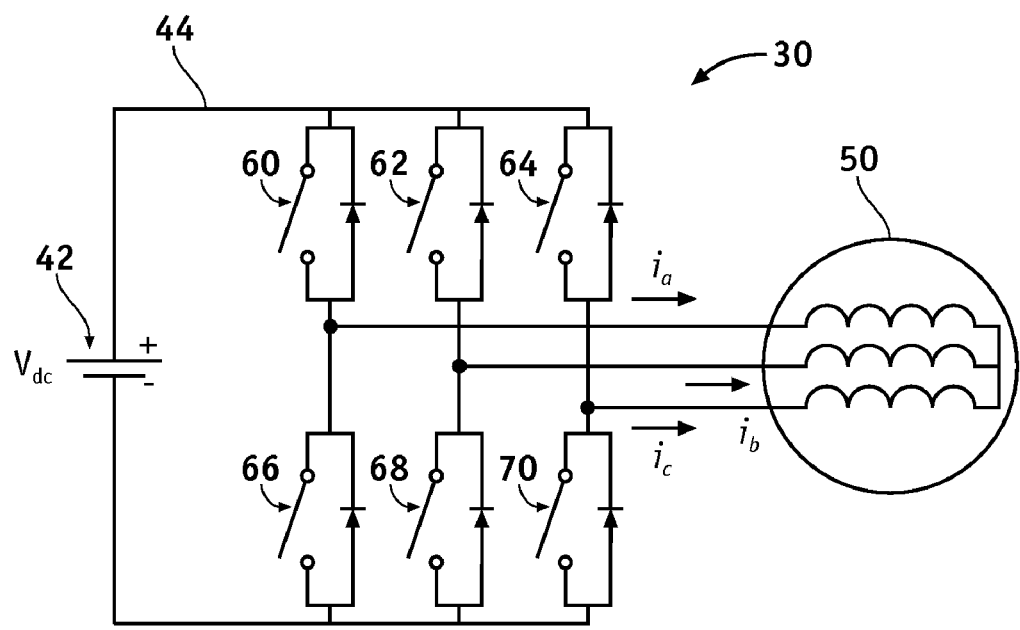
FIG. 3 is a schematic view of an inverter within the automobile of FIG. 1.

FIG. 3 illustrates the inverter 44 of FIGS. 1 and 2 in greater detail. The inverter 44 includes a three-phase circuit coupled to the motor 50. More specifically, the inverter 44 includes a switch network having a first input coupled to a voltage source $V_{dc}$ (e.g., the battery 42) and an output coupled to the motor 50. Although a single voltage source is shown, a distributed direct current (DC) link with two series sources may be used.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the voltage source 42 and a second switch 66, 68, and 70 having a second terminal coupled to a negative electrode of the voltage source 42 and having a first terminal coupled to a second terminal of the respective first switch 60, 62, and 64.

During operation, still referring to FIG. 1, the vehicle 30 is operated by providing power to the wheels 36 with the combustion engine 48 and the electric motor 50 in an alternating manner and/or with the combustion engine 48 and the electric motor 50 simultaneously. In order to power the electric motor 50, DC power is provided from the battery 42 to the inverter 44, which converts the DC power into AC power, before the power is sent to the electric motor 50. As will be appreciated by one skilled in the art, the conversion of DC power to AC power is substantially performed by operating (i.e., repeatedly switching) the transistors within the inverter 44 at a "switching frequency".

Generally, the controller 56 produces a signal for controlling the switching action of the inverter 44. As one example, the controller 56 produces a discontinuous PWM (DPWM) signal having a single zero vector associated with each switching cycle of the inverter 44. The inverter 44 then converts the PWM signal to a modulated voltage waveform for operating the motor 50. In a preferred embodiment, the controller 56 produces a PWM signal that controls the power inverter 44 to maintain the switching frequency of the power inverter 44 at a first, relatively high, set frequency responsive to a commanded torque of the electric motor 50 being below a first level. The controller 56 furthermore produces a PWM signal that controls the power inverter to provide a signal controlling the power inverter to determine the switching frequency of the power inverter as a function of the commanded torque of the electric motor while maintaining the switching frequency above a dynamic frequency limit, when the commanded torque is between the first and second levels.

This configuration of the drive system ensures good control and efficient use of power in the electric motor drive system. Specifically, the switching frequency of a PWM inverter affects the power losses in semiconductor switches. Thus, lowering the switching frequency can reduce power losses. However, at higher motor speeds, a higher switching frequency is desirable to maintain an adequate pulse ratio for precise controllability of the electric motor. Additionally, it is desirable to maintain the switching frequency above levels that cause excessive noise emissions. Third, the switching frequency affects the maximum controllable stator fundamental frequency. Fourth, the switching frequency can affect the phase ripple current, which can affect losses in both the inverter and motor. Additionally, the ripple current can cause unwanted torque ripple in the drive.

The inverter switching losses can be roughly described in equation 1. Specifically, equation 1 shows of switching losses $P_{SW}$ are proportionate to voltage $V_{dc}$, phase current $I_{ph}$ and switching frequency $f_{sw}$.

$$P_{sw} \propto V_{dc} I_{ph} f_{sw} \quad (1)$$

Thus, to maintain constant switching losses the switching frequency could be adjusted to be inversely proportional to the phase current. Since the phase current is roughly proportional to the motor torque (in the unsaturated case, and below base speed), phase current can be roughly equated to motor torque. Thus, adjusting the switching frequency as a function inversely proportional to motor torque will tend to maintain constant switching losses in the semiconductor devices Furthermore, acoustic noise can be generated by the motor due to the switching frequency. In general, the human ear is most sensitive to frequencies in the range of 1 kHz to 5 kHz. Thus, to minimize acoustic noise it is desirable to operate inverter at a much higher range, for example 8 kHz.

In general, the fundamental electrical frequency ($f_e$) of an electric motor is proportional to motor speed. To control the stator currents in a stable manner, the ratio of switching frequency to fundamental electrical frequency needs to remain sufficiently high. This ratio is sometimes referred to as a pulse ratio. For example, in some typical motor controls a pulse ratio of about 10:1 is needed to guarantee stable operation. Thus, it is desirable to maintain the switching frequency above a level that prevents the pulse ratio from dropping below the amount needed to guarantee stable operation.

There are thus conflicting goals with respect to the switching frequency. The embodiments of the invention are configured to control the switching frequency to be at high value to reduce acoustic noise and improve control at high speeds and low torque, and then reduce the switching frequency at high torque and current to reduce power loss and protect semiconductor switches from thermal overstress.

Returning to FIGS. 1-3, the controller 56 is thus configured to produce a PWM signal that controls the power inverter 44 to maintain the switching frequency of the power inverter 44 at a first, relatively high, set frequency responsive to a commanded torque of the electric motor 50 being below a first level. The controller 56 furthermore produces a PWM signal that controls the power inverter to provide a signal controlling the power inverter to determine the switching frequency of the power inverter as a function of the commanded torque of the electric motor while maintaining the switching frequency above a dynamic frequency limit, when the commanded torque is between the first and second levels.

In general, the first set frequency is set at a relatively high level that provides good control over the electric motor 50, without exceeding the frequency response of the switches in the inverter 44, or causing excessive heat due to switching losses. For example, in some embodiments the first set frequency will comprise a switching frequency of 8 kHz.

At intermediate motor speeds, the inverter 44 is operated with the switching frequency that varies as a function of torque. In general, the switching frequency is reduced as commanded torque increases, and a variety of functional relationships between switching frequency and torque can be used to accomplish this. For example, the relationship between switching frequency and torque can be linear, non-linear or any combination thereof during intermediate motor speeds.

As stated above, during operation of the electric motor 50 the switching frequency is varied as a function of commanded torque. However, at the same time, the operation of the inverter 44 is controlled to ensure that the switching frequency is maintained above a dynamic frequency limit. In general, the dynamic frequency limit itself varies with, and is responsive to motor speed. The dynamic frequency limit is preferably implemented to allow a sufficient reduction in switching frequency to reduce power losses while maintaining a high enough switching frequency to maintain good current control at the motors present speed. Furthermore, the dynamic frequency limit is preferably selected to limit acoustic noise to acceptable levels.

In one embodiment, the dynamic frequency limit is a function of motor speed when the electric motor is being operated at intermediate speeds, i.e., between a first speed level and a second speed level. Then, when the motor speed is below first speed level, the dynamic frequency limit is maintained at a relatively low specified, set frequency.

For example, the dynamic frequency limit can be selected to maintain a specified pulse ratio during operation of the electric motor, where the pulse ratio is generally defined as a ratio of switching frequency to fundamental frequency. As the fundamental frequency is related to motor speed, configuring the dynamic limit to maintain a specified pulse ratio effectively determines the dynamic frequency limit as a function of motor speed. Maintaining a high pulse ratio assures a sufficient amount of cycles in the inverter 44 to provide accurate control over the current in the electric motor 50. Thus, the dynamic frequency limit is implemented to make sure that as motor speed increases, the frequency limit also increases to ensure that effective motor control is maintained.

Additionally, the dynamic frequency limit can be set to operate at a relatively high frequency limit when the electric motor is operated at speeds above the second speed level. In one specific embodiment, this high frequency limit can be same frequency the inverter is operated at low torque levels (e.g., 8 kHz).

Figure 4:
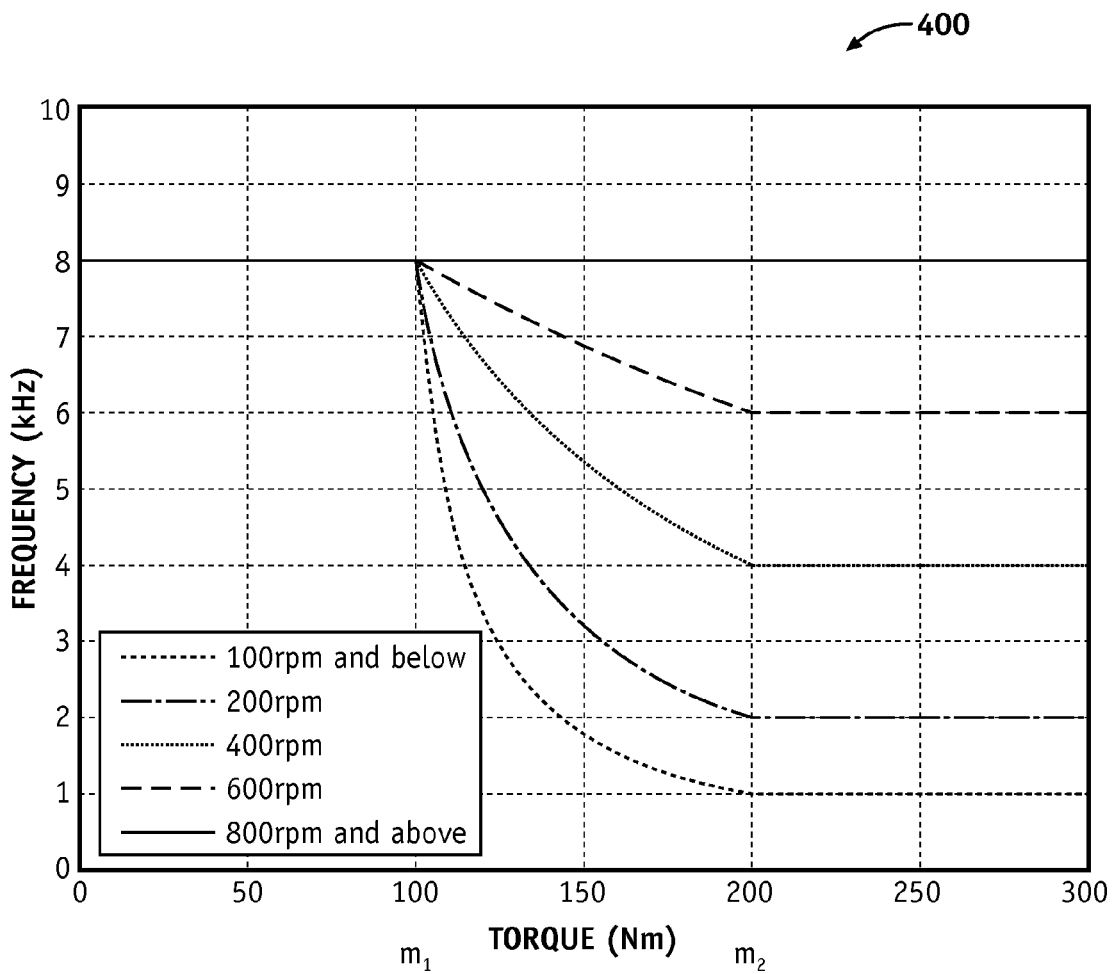
FIG. 4 is a graphical representation of exemplary switching frequency control scheme.

Turning no to FIG. 4, a graphical representation 400 of an exemplary switching frequency control scheme is illustrated. In this representation, the plot of the switching frequency as a function of the torque command is illustrated for motor speed values of 100, 200, 400, 600, 800 and 800 RPM. Below a first torque value of $m_1$ (e.g., 100 Nm), the switching frequency is held to a predetermined maximum value (e.g., 8 kHz) regardless of motor speed. As the torque command exceeds the first value, the switching frequency is reduced inversely proportional to torque while maintaining the switching frequency above a dynamic frequency limit.

The dynamic frequency limit itself varies with, and is responsive to motor speed. This causes the separate plots for each of the illustrated motor speed values. In the representation of FIG. 4, the dynamic frequency limit is a function of motor speed when the electric motor is being operated at intermediate speeds, i.e., between a first speed level and a second speed level. Then, when the motor speed is below first speed level, the dynamic frequency limit is maintained at a relatively low specified, set frequency of 1 kHz.

Figure 5:
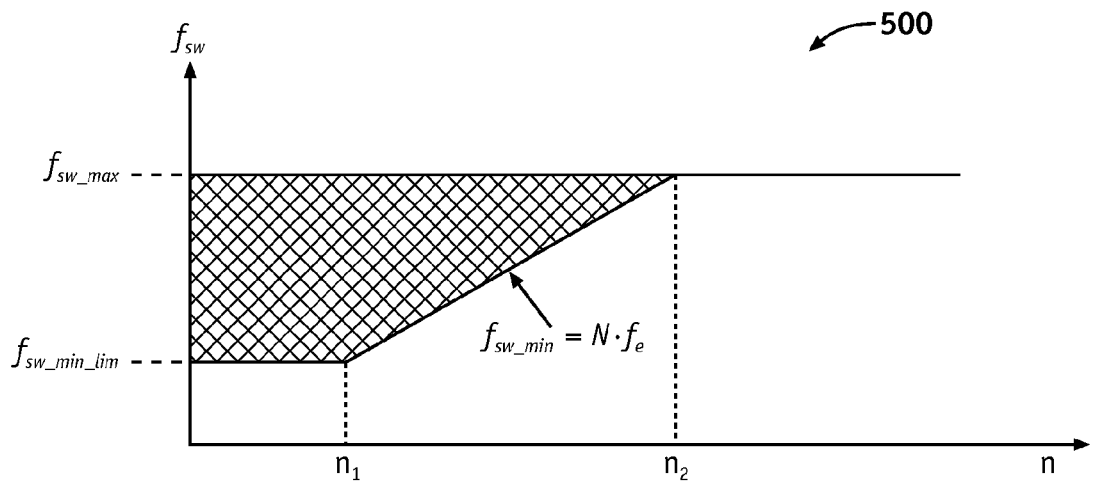
FIG. 5 is a graphical representation of a dynamic frequency limit control scheme.

Turning now to FIG. 5, a graphical representation 500 of an exemplary dynamic frequency limit scheme is illustrated. This is an example of the type of representation, that when used with function to control switching frequency as a function of torque, results in switching frequency values illustrated in FIG. 4.

In the representation 500, the dynamic limit of the switching frequency is plotted as function of motor speed. At low motor speeds below speed $n_1$ (e.g., 100 RPM), the dynamic limit of the switching frequency will be held at a preset low set frequency ($f_{sw\_min\_lim}$). This level is selected to maintain good control while avoiding excessive acoustic noise and power loss, and is set at 1 kHz in this example. Of course, this is just one example, and other limit values could also be used.

At intermediate motor speeds (between $n_1$ and $n_2$ (e.g., 800 RPM)) the switching frequency of the inverter will be determined as function of motor speed. In the illustrated embodiment, the function is configured to maintain a desired minimum pulse ratio (N) between the switching frequency ($f_{sw}$) and the fundamental frequency ($f_e$). During operation of the electric motor, the switching frequency of the inverters is operated as a function of commanded torque, reducing the switching frequency as the commanded torque is increased, while the switching frequency is maintained above dynamic frequency limit that is dependent on motor speed. Stated another way, motor speed determines the minimum possible switching frequency, with the torque command slewing the actual switching frequency between the maximum and the speed dependent minimum frequencies. Thus, the operational range of switching frequency $f_{sw}$ is illustrated in FIG. 5 as the hatched area above the dynamic frequency limit $f_{sw\_min}$ and below the maximum set switching frequency of $f_{sw\_max}$. It should be noted, that above speeds of $n_2$, the dynamic frequency limit $f_{sw\_min}$ and the maximum frequency $f_{sw\_max}$ converge, and thus the motor will operate at the maximum switching frequency $f_{sw\_max}$ above speeds of $n_2$ regardless of torque.

It should again be noted that the RPM values of $n_1$ and $n_2$, and the frequency values of $f_{sw\_max}$ and $f_{sw\_min\_lim}$, and the slope and/or function of the dynamic frequency limit $f_{sw\_min}$ are merely exemplary, and that other values and functions could be used depending on the details of the application.

Another exemplary illustration of the techniques for determining the switching frequency are illustrated in Equation 2.

$$\text{if } (|m^*| < m_1) \; f_{sw} = f_{sw\_max} \quad (2)$$

$$\text{else if } (|m^*| > m_2) \; f_{sw} = s_{sw\_min}$$

$$\text{else } f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where
$f_{sw\_min} = f_{sw\_min\_lim}$ below speed $n_1$
$f_{sw\_min} = N^* f_e$ between $n_1$ and $n_2$
$f_{sw\_min} = f_{sw\_max}$ above speed $n_2$
$f_{sw\_max}$ = a selected constant
$f_{sw\_min\_lim}$ = a selected constant In equation 2, the switching frequency is determined as a function of the commanded torque $m^*$ while being maintained above a dynamic frequency limit $f_{sw\_min}$. If the commanded torque is less than a torque level $m_1$, the switching frequency is set to the maximum frequency $f_{sw\_max}$. If the commanded torque above a torque level $m_2$, the switching frequency $f_{sw}$ is reduced down to the dynamic frequency limit $f_{sw\_min}$. At intermediate torque values, the switching frequency is a function of torque and the frequency limits.

Also shown in the example of equation 2, the dynamic frequency limit $f_{sw\_min}$ is itself a function of motor speed, set equal to $f_{sw\_max}$ at speeds above $n_2$, set equal to a minimum value $f_{sw\_min\_lim}$ at speeds below $n_1$, and determined as function of fundamental frequency $f_e$ and a desired pulse ratio N at intermediate speeds.

Again, the values selected for these various parameters would be selected based on the needs of a particular application. For example, the frequency profile may be selected to minimize junction temperature swings for frequent operating points, in order to extend the lifetime of the devices. For example, $m_1$ can be selected to maintain $f_{sw}$ at its maximum value during a typical engine crank event, to avoid acoustic noise problems. Also, it should be noted that equation 2 illustrates just one exemplary function for adjusting switching frequencies as a function of torque (i.e., inversely proportional). However, alternate functions could also be used. Likewise, while equation 2 illustrates the dynamic frequency limit $f_{sw\_min}$ determined as a linear function of fundamental frequency $f_e$ at intermediate speeds, alternate functions could also be used.

The various embodiments thus provide a system and method that controls the power inverter by, responsive to a commanded torque of the electric motor being below a first torque level, controlling the power inverter to set a switching frequency of the power inverter at a first set frequency; and, responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit. The method reduces switching frequencies in the inverter at high commanded torques, while maintaining the switching frequencies above dynamic frequency limit that provides effective control over the motor. This reduces power loss and thus improves the efficiency of the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a power inverter coupled to an electric motor in an electric drive system of an automobile, the method comprising:

responsive to a commanded torque of the electric motor being below a first torque level, controlling the power inverter to set a switching frequency of the power inverter at a first set frequency; and responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit.

2. The method of claim 1, wherein the dynamic frequency limit is determined by:

responsive to the motor speed of the electric motor being between a first speed level and a second speed level, determining the dynamic frequency limit as a function of the motor speed; and responsive to the motor speed being below the first speed level, determining the dynamic frequency limit to set the dynamic frequency limit at a second set frequency.

3. The method of claim 2, wherein the dynamic frequency limit is further determined by, responsive to the motor speed being above second speed level, determining the dynamic frequency limit to set the dynamic frequency limit at the first set frequency.

4. The method of claim 2, wherein the step of determining the dynamic frequency limit as a function of the motor speed comprises determining the dynamic frequency limit to maintain a set pulse ratio of switching frequency to the motor speed.

5. The method of claim 1, wherein the step of controlling the power inverter to determine the switching frequency of the power inverter as a function of the commanded torque of the electric motor while maintaining the switching frequency above the dynamic frequency limit comprises decreasing the switching frequency as the commanded torque increases.

6. The method of claim 1, wherein the step of controlling the power inverter to determine the switching frequency of the power inverter as a function of the commanded torque of the electric motor while maintaining the switching frequency above the dynamic frequency limit comprises determining the switching frequency as:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, $m^*$ is the commanded torque, $f_{sw\_max}$ is the first set frequency, $f_{sw\_min}$ is the dynamic frequency limit, $m_1$ is the first torque level, and $m_2$ is the second torque level.

7. The method of claim 1, wherein the electric motor comprises a sinusoidally-wound alternating current (AC) motor.

8. A method for controlling a power inverter coupled to an electric motor in an electric drive system of an automobile, the method comprising:

responsive to a commanded torque of the electric motor being below a first torque level, controlling the power inverter to set a switching frequency of the power inverter at a first set frequency; and responsive to the commanded torque of the electric motor being between the first torque level and a second torque level, controlling the power inverter to determine the switching frequency of the power inverter as a function of the commanded torque of the electric motor while maintaining the switching frequency above a dynamic frequency limit, wherein the function of the commanded torque is selected to decrease switching frequency as commanded torque increases, and wherein the dynamic frequency limit is determined by:

responsive to the motor speed of the electric motor being between a first speed level and a second speed level, determining the dynamic frequency limit as a function of the motor speed to maintain set pulse ratio of motor switching frequency to motor speed;

responsive to the motor speed being below the first speed level, determining the dynamic frequency limit to set the dynamic frequency limit at a second set frequency; and responsive to the motor speed being above second speed level, determining the dynamic frequency limit to set the dynamic frequency limit at the first set frequency.

9. The method of claim 8, wherein the step of controlling the power inverter to determine the switching frequency of the power inverter as a function of the commanded torque of the electric motor while maintaining the switching frequency above the dynamic frequency limit comprises determining the switching frequency as:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, $m^*$ is the commanded torque, $f_{sw\_max}$ is the first set frequency, $f_{sw\_min}$ is the dynamic frequency limit, $m_1$ is the first torque level, and $m_2$ is the second torque level.

10. The method of claim 8, wherein the electric motor comprises a sinusoidally-wound alternating current (AC) motor.

11. An automotive electric drive system comprising:
an electric motor;
a power inverter coupled to the electric motor; and
at least one processor coupled to the electric motor and the inverter, the at least one processor being configured to:
responsive to a commanded torque of the electric motor being below a first torque level, provide a signal controlling the power inverter to set a switching frequency of the power inverter at a first set frequency;
responsive to the commanded torque of the electric motor being between the first torque level and a second torque level, provide a signal controlling the power inverter to determine the switching frequency of the power inverter as a function of the commanded torque of the electric motor while maintaining the switching frequency above a dynamic frequency limit.

12. The automotive electric drive system of claim 11, wherein the at least one processor is further configured to:
responsive to the motor speed of the electric motor being between a first speed level and a second speed level, determine the dynamic frequency limit as a function of the motor speed; and
responsive to the motor speed being below the first speed level, determine the dynamic frequency limit to set the dynamic frequency limit at a second set frequency.

13. The automotive electric drive system of claim 12, wherein the at least one processor is further configured to, responsive to the motor speed being above second speed level, determine the dynamic frequency limit to set the dynamic frequency limit at the first set frequency.

14. The automotive electric drive system of claim 11, wherein the at least one processor is configured to determine the dynamic frequency limit as a function of the motor speed to maintain a set pulse ratio of switching frequency to the motor speed.

15. The automotive electric drive system of claim 11, wherein the function of the commanded torque decreases the switching frequency as the commanded torque increases.

16. The automotive electric drive system of claim 11, wherein the function of the commanded torque comprises:

$$f_{sw} = \frac{f_{sw\_max}}{1 + \left(\frac{f_{sw\_max}}{f_{sw\_min}} - 1\right)\left(\frac{|m^*| - m_1}{m_2 - m_1}\right)}$$

where $f_{sw}$ is the switching frequency, $m^*$ is the commanded torque, $f_{sw\_max}$ is the first set frequency, $f_{sw\_min}$ is the dynamic frequency limit, $m_1$ is the first torque level, and $m_2$ is the second torque level.

17. The automotive electric drive system of claim 11, wherein the electric motor comprises a sinusoidally-wound alternating current (AC) motor.

* * * * *